United States Patent
Robinson

(10) Patent No.: US 12,542,812 B2
(45) Date of Patent: *Feb. 3, 2026

(54) BROWSER EXTENSION ACCESS BASED ON RE-AUTHORIZATION

(71) Applicant: Netskope, Inc., Santa Clara, CA (US)

(72) Inventor: James S. Robinson, Indianapolis, IN (US)

(73) Assignee: Netskope, Inc., Santa Clara, CA (US)

( * ) Notice: Subject to any disclaimer, the term of this patent is extended or adjusted under 35 U.S.C. 154(b) by 222 days.

This patent is subject to a terminal disclaimer.

(21) Appl. No.: 18/464,092

(22) Filed: Sep. 8, 2023

(65) Prior Publication Data

US 2024/0163317 A1    May 16, 2024

Related U.S. Application Data

(63) Continuation of application No. 17/985,719, filed on Nov. 11, 2022, now Pat. No. 11,792,234.

(51) Int. Cl.
*H04L 9/40*    (2022.01)

(52) U.S. Cl.
CPC .......... *H04L 63/20* (2013.01); *H04L 63/1408* (2013.01)

(58) Field of Classification Search
CPC ............................ H04L 63/20; H04L 63/1408
(Continued)

(56) References Cited

U.S. PATENT DOCUMENTS 5,440,723 A    8/1995 Arnold et al.
6,513,122 B1   1/2003 Magdych et al.
(Continued)

FOREIGN PATENT DOCUMENTS

EP    1063833 A2    12/2000
EP    2973158 A1    1/2016
JP    2012033189 A   2/2012

OTHER PUBLICATIONS

Martin, Victoria "Cooperative Security Fabric," The Fortinet Cookbook, Jun. 8, 2016, 6 pgs., archived Jul. 28, 2016 at https://web.archive.org/web/20160728170025/http://cookbook.fortinet.com/cooperative-security-fabric-54.

(Continued)

*Primary Examiner* — Aubrey H Wyszynski
(74) *Attorney, Agent, or Firm* — MUGHAL GAUDRY & FRANKLIN PC

(57) ABSTRACT

A policy-based browser system for managing browser extensions used to access functionalities on a web browser in a cloud-based multi-tenant system. The policy-based browser system includes a client device, a web server, and a mid-link server. A set of policies is identified for the installation of a browser extension requested using the client device. The policies specify access to browser extensions at the client device for accessing functionalities associated with the browser extensions. The functionalities are associated with a user application on the client device. The browser extension is analyzed based on usage history for the installation of the browser extension. Non-compliance with one or more policies from the set of policies of the browser extension is flagged for a re-authorization. Based on the re-authorization, either the browser extension is allowed or blocked or partially allowed for the installation and access to the corresponding functionality of the browser extension.

20 Claims, 8 Drawing Sheets

(58) Field of Classification Search
USPC .......................................................... 726/1
See application file for complete search history.

(56) References Cited

U.S. PATENT DOCUMENTS

| | | | |
|---|---|---|---|
| 6,622,248 B1 | 9/2003 | Hirai | |
| 7,080,408 B1 | 7/2006 | Pak et al. | |
| 7,298,864 B2 | 11/2007 | Jones | |
| 7,376,719 B1 | 5/2008 | Shafer et al. | |
| 7,590,684 B2 | 9/2009 | Herrmann | |
| 7,627,896 B2 | 12/2009 | Herrmann | |
| 7,634,800 B2 | 12/2009 | Ide et al. | |
| 7,735,116 B1 | 6/2010 | Gauvin | |
| 7,966,654 B2 | 6/2011 | Crawford | |
| 8,000,329 B2 | 8/2011 | Fendick et al. | |
| 8,296,178 B2 | 10/2012 | Hudis et al. | |
| 8,713,630 B2 | 4/2014 | Raleigh | |
| 8,745,205 B2 | 6/2014 | Anderson et al. | |
| 8,793,151 B2 | 7/2014 | DelZoppo et al. | |
| 8,839,417 B1 | 9/2014 | Jordan | |
| 9,197,601 B2 | 11/2015 | Pasdar | |
| 9,225,734 B1 | 12/2015 | Hastings | |
| 9,231,968 B2 | 1/2016 | Fang et al. | |
| 9,280,678 B2 | 3/2016 | Redberg | |
| 9,288,199 B1 | 3/2016 | Winn et al. | |
| 9,811,662 B2 | 11/2017 | Sharpe et al. | |
| 10,084,825 B1 | 9/2018 | Xu | |
| 10,237,282 B2 | 3/2019 | Nelson et al. | |
| 10,334,442 B2 | 6/2019 | Vaughn et al. | |
| 10,382,468 B2 | 8/2019 | Dods | |
| 10,484,334 B1 | 11/2019 | Lee et al. | |
| 10,721,239 B2 | 7/2020 | Koottayi et al. | |
| 10,826,941 B2 | 11/2020 | Jain et al. | |
| 11,032,301 B2 | 6/2021 | Mandrychenko et al. | |
| 11,036,856 B2 | 6/2021 | Graun et al. | |
| 11,165,585 B2 | 11/2021 | Wojcik | |
| 11,281,775 B2 | 3/2022 | Burdett et al. | |
| 11,468,172 B2* | 10/2022 | Rickerd | G06F 21/577 |
| 11,586,769 B2 | 2/2023 | Adams et al. | |
| 11,740,765 B2* | 8/2023 | Angappan | G06F 16/248 |
| | | | 715/738 |
| 11,792,234 B1* | 10/2023 | Robinson | H04L 63/20 |
| | | | 726/1 |
| 2002/0099666 A1 | 7/2002 | Dryer et al. | |
| 2003/0055994 A1 | 3/2003 | Herrmann et al. | |
| 2003/0063321 A1 | 4/2003 | Inoue et al. | |
| 2003/0172292 A1 | 9/2003 | Judge | |
| 2003/0204632 A1 | 10/2003 | Willebeek-LeMair et al. | |
| 2004/0015719 A1 | 1/2004 | Lee et al. | |
| 2005/0010593 A1 | 1/2005 | Fellenstein et al. | |
| 2005/0271246 A1 | 12/2005 | Sharma et al. | |
| 2006/0156401 A1 | 7/2006 | Newstadt et al. | |
| 2007/0204018 A1 | 8/2007 | Chandra et al. | |
| 2007/0237147 A1 | 10/2007 | Quinn et al. | |
| 2008/0069480 A1 | 3/2008 | Aarabi et al. | |
| 2008/0134332 A1 | 6/2008 | Keohane et al. | |
| 2009/0144818 A1 | 6/2009 | Kumar et al. | |
| 2009/0249470 A1 | 10/2009 | Litvin et al. | |
| 2009/0300351 A1 | 12/2009 | Lei et al. | |
| 2010/0017436 A1 | 1/2010 | Wolge | |
| 2010/0077444 A1 | 3/2010 | Forristal | |
| 2011/0119481 A1 | 5/2011 | Auradkar et al. | |
| 2011/0145594 A1 | 6/2011 | Jho et al. | |
| 2012/0278896 A1 | 11/2012 | Fang et al. | |
| 2013/0159694 A1 | 6/2013 | Chiueh et al. | |
| 2013/0298190 A1 | 11/2013 | Sikka et al. | |
| 2013/0347085 A1 | 12/2013 | Hawthorn et al. | |
| 2014/0013112 A1 | 1/2014 | Cidon et al. | |
| 2014/0068030 A1 | 3/2014 | Chambers et al. | |
| 2014/0068705 A1 | 3/2014 | Chambers et al. | |
| 2014/0259093 A1 | 9/2014 | Narayanaswamy et al. | |
| 2014/0282843 A1 | 9/2014 | Buruganahalli et al. | |
| 2014/0359282 A1 | 12/2014 | Shikfa et al. | |
| 2014/0366079 A1 | 12/2014 | Pasdar | |
| 2015/0100357 A1 | 4/2015 | Seese et al. | |
| 2016/0088021 A1 | 3/2016 | Venkata et al. | |
| 2016/0315947 A1 | 10/2016 | Boss et al. | |
| 2016/0323318 A1 | 11/2016 | Terrill et al. | |
| 2016/0350145 A1 | 12/2016 | Botzer et al. | |
| 2017/0064005 A1 | 3/2017 | Lee | |
| 2017/0093917 A1 | 3/2017 | Chandra et al. | |
| 2017/0250951 A1 | 8/2017 | Wang et al. | |
| 2020/0050686 A1 | 2/2020 | Kamalapuram et al. | |
| 2022/0385669 A1* | 12/2022 | Robinson | H04L 63/102 |
| 2023/0132478 A1 | 5/2023 | Robinson et al. | |

OTHER PUBLICATIONS

Huckaby, Jeff Ending Clear Text Protocols,' Rackaid.com, Dec. 9, 2008, 3 pgs.

Nevvton, Harry "fabric," Newton's Telecom Dictionary, 30th Updated, Expanded, Anniversary Edition, 2016, 3 pgs.

Fortinet, "Fortinet Security Fabric Earns 100% Detection Scores Across Several Attack Vectors in NSS Labs' Latest Breach Detection Group Test [press release]", Aug. 2, 2016, 4 pgs, available at https://www.fortinet.com/de/corporate/about-us/newsroom/press-releases/2016/security-fabric-earns-100-percent-breach-detection-scores-nss-labs.

Fortinet, "Fortinet Security Fabric Named 2016 CRN Network Security Product of the Year [press release]", Dec. 5, 2016, 4 pgs, available at https://www.fortinet.com/corporate/about-us/newsroom/press-releases/2016/fortinet-security-fabric-named-2016-crn-network-security-product.

McCullagh, Declan, "How safe is instant messaging? A security and privacy survey," CNET, Jun. 9, 2008, 14 pgs.

Beck et al. "IBM and Cisco: Together for a World Class Data Center," IBM Redbooks, Jul. 2013, 654 pgs.

Martin, Victoria "Installing internal FortiGates and enabling a security fabric," The Fortinet Cookbook, Jun. 8, 2016, 11 pgs, archived Aug. 28, 2016 at https://web.archive.org/web/20160828235831/http://cookbook.fortinet.com/installing-isfw-fortigate-enabling-csf-54.

Zetter, Kim, "Revealed: The Internet's Biggest Security Hole," Wired, Aug. 26, 2008, 13 pgs.

Adya et al., 'Farsite: Federated, available, and reliable storage for an incompletely trusted environment, SIGOPS Oper. Syst. Rev. 36, SI, Dec. 2002, pp. 1-14.

Agrawal et al., "Order preserving encryption for numeric data," In Proceedings of the 2004 ACM SIGMOD international conference on Management of data, Jun. 2004, pp. 563-574.

Balakrishnan et al., "A layered naming architecture for the Internet," ACM SIGCOMM Computer Communication Review, 34(4), 2004, pp. 343-352.

Downing et al., Naming Dictionary of Computer and Internet Terms, (11th Ed.) Barron's, 2013, 6 pgs.

Downing et al., Dictionary of Computer and Internet Terms, (10th Ed.) Barron's, 2009, 4 pgs.

Zoho Mail, "Email Protocols: What they are & their different types," 2006, 7 pgs. available at https://www.zoho.com/mail/glossary/email-protocols.html#:~:text=mode of communication.-,What are the different email protocols%3F,and also has defined functions.

NIIT, Special Edition Using Storage Area Networks, Que, 2002, 6 pgs.

Chapple, Mike, "Firewall redundancy: Deployment scenarios and benefits," Tech Target, 2005, 5 pgs. available at https://www.techtarget.com/searchsecurity/tip/Firewall-redundancy-Deployment-scenarios-and-benefits?%20Offer=abt_pubpro_AI-Insider.

Fortinet, FortiGate—3600 User Manual (vol. 1, Version 2.50 MR2) Sep. 5, 2003, 329 pgs.

Fortinet, FortiGate SOHO and SMB Configuration Example, (Version 3.0 MR5), Aug. 24, 2007, 54 pgs.

Fortinet, FortiSandbox—Administration Guide, (Version 2.3.2), Nov. 9, 2016, 191 pgs.

Fortinet, FortiSandbox Administration Guide, (Version 4.2.4) Jun. 12, 2023, 245 pgs. available at https://fortinetweb.s3.amazonaws.com/docs.fortinet.com/v2/attachments/fba32b46-b7c0-11ed-8e6d-fa163e15d75b/FortiSandbox-4.2.4-Administration_Guide.pdf.

(56) References Cited

OTHER PUBLICATIONS

Fortinet, FortiOS—Administration Guide, (Versions 6.4.0), Jun. 3, 2021, 1638 pgs.
Heady et al., "The Architecture of a Network Level Intrusion Detection System," University of New Mexico, Aug. 15, 1990, 21 pgs.
Kephart et al., "Fighting Computer Viruses," Scientific American (vol. 277, No. 5) Nov. 1997, pp. 88-93.
Wang, L., Chapter 5: Cooperative Security in D2D Communications, "Physical Layer Security in Wireless Cooperative Networks," 41 pgs. first online on Sep. 1, 2017 at https://link.springer.com/chapter/%2010.1007/978-3-319-61863-0_5.
Lee et al., "A Data Mining Framework for Building Intrusion Detection Models," Columbia University, n.d. 13 pgs.
Merriam-Webster Dictionary, 2004, 5 pgs.
Microsoft Computer Dictionary, (5th Ed.), Microsoft Press, 2002, 8 pgs.
Microsoft Computer Dictionary, (4th Ed.), Microsoft Press, 1999, 5 pgs.
Mika et al. "Metadata Statistics for a Large Web Corpus," LDOW2012, Apr. 16, 2012, 6 pgs.
Oxford Dictionary of Computing (6th Ed.), 2008, 5 pgs.
Paxson, Vern, "Bro: a System for Detecting Network Intruders in Real-Time," Proceedings of the 7th USENIX Security Symposium, Jan. 1998, 22 pgs.
Fortinet Inc., U.S. Appl. No. 62/503,252, "Building a Cooperative Security Fabric of Hierarchically Interconnected Network Security Devices." n.d., 87 pgs.
Song et al., "Practical techniques for searches on encrypted data," In Proceeding 2000 IEEE symposium on security and privacy. S&P 2000, May 2000, pp. 44-55.
Dean, Tamara, Guide to Telecommunications Technology, Course Technology, 2003, 5 pgs,.
U.S. Appl. No. 60/520,577, "Device, System, and Method for Defending a Computer Network," Nov. 17, 2003, 21 pgs.
U.S. Appl. No. 60/552,457, "Fortinet Security Update Technology," Mar. 2004, 6 pgs.
Tittel, Ed, Unified Threat Management For Dummies, John Wiley & Sons, Inc., 2012, 76 pgs.
Fortinet, FortiOS Handbook: UTM Guide (Version 2), Oct. 15, 2010, 188 pgs.
Full Definition of Security, Wayback Machine Archive of Merriam-Webster on Nov. 17, 2016, 1 pg.
Definition of Cooperative, Wayback Machine Archive of Merriam-Webster on Nov. 26, 2016, 1 pg.
Pfaffenberger, Bryan, Webster's New World Computer Dictionary, (10th Ed.), 2003, 5 pgs.

\* cited by examiner

BROWSER EXTENSION ACCESS BASED ON RE-AUTHORIZATION

PRIORITY

This application is a continuation of U.S. application Ser. No. 17/985,719, filed Nov. 11, 2022, the contents of which is incorporated herein by reference in its entirety.

BACKGROUND

This disclosure relates in general to web browser extension systems and, nonetheless not by way of limitation, to policy-controlled authorization and management of browser extensions for secure access to functionalities among other things.

Extensions add features and functions to a browser. Popular web browsers like Chrome™, Firefox™, Edge™, or Safari™ support thousands of extensions. The browser extensions offer many personal and business-related benefits to users. However, these extensions are susceptible to exploitation. The extensions also have access to personal and work-related data and can be used to bypass security controls.

The browser extensions typically have access to sensitive data, such as browsing history, and may alter browser settings, user interface items, or replace website content resulting in malware and adware. Hence, extra cautiousness on part of the users is entailed while installing the extensions. Further, managing the extensions by administrators on unmanaged devices is another challenge.

SUMMARY

In one embodiment, the present disclosure provides a policy-based browser system for managing browser extensions used to access functionalities on a web browser in a cloud-based multi-tenant system. The policy-based browser system includes a client device, a web server, and a mid-link server. A set of policies is identified for the installation of a browser extension requested using the client device. The policies specify access to browser extensions at the client device for accessing functionalities associated with the browser extensions. The functionalities are associated with a user application on the client device. The browser extension is analyzed based on usage history for the installation of the browser extension. Non-compliance with one or more policies from the set of policies of the browser extension is flagged for a re-authorization. Based on the re-authorization, either the browser extension is allowed or blocked or partially allowed for the installation and access to the corresponding functionality of the browser extension.

In an embodiment, a policy-based browser system for managing browser extensions used to access functionalities on web browsers in a cloud-based multi-tenant system. The policy-based browser system includes a client device having a local application, a web server, and a mid-link server. The local application is used to access a functionality of a browser extension of a plurality of browser extensions. The browser extension is requested for installation on the client device. The web server is configured to provide the functionality of the browser extension on a web browser of the client device. The mid-link server is configured to identify a set of policies from a plurality of policies for the installation of the browser extension. The plurality of policies specify access to the plurality of browser extensions to be used at the client device for accessing a plurality of functionalities associated with the plurality of browser extensions. The plurality of functionalities is associated with a user application on the client device. The browser extension is analyzed on usage history for the installation of the browser extension. Compliance with the set of policies of the browser extension is checked. Non-compliance with one or more policies from the set of policies of the browser extension is flagged for a re-authorization. Based on the re-authorization, either the browser extension is allowed or blocked or partially allowed for the installation and access to the corresponding functionality of the browser extension.

In another embodiment, a method for policy-controlled browser extensions for providing secure access to features and functionalities from a browser in cloud-based multi-tenant systems. In one step, a request is made using a local application running on a client device, access to a functionality on a browser extension of a plurality of browser extensions. The browser extension is requested for installation on the client device. The mid-link server identifies a set of policies from a plurality of policies for the installation of the browser extension. The plurality of policies specify access to the plurality of browser extensions to be used at the client device for accessing a plurality of functionalities associated with the plurality of browser extensions. The plurality of functionalities is associated with a user application on the client device. The browser extension is analyzed on usage history for the installation of the browser extension. Compliance with the set of policies of the browser extension is checked. Non-compliance with one or more policies from the set of policies of the browser extension is flagged for a re-authorization. Based on the re-authorization, either the browser extension is allowed or blocked or partially allowed for the installation and access to the corresponding functionality of the browser extension.

In yet another embodiment, a browser controlled system for providing access to browser extensions based on policies in cloud-based multi-tenant systems, the browser controlled system comprising a plurality of servers, collectively having code for:

- requesting by a local application running on a client device, access to a functionality on a browser extension of a plurality of browser extensions, wherein the browser extension is requested for installation on the client device;
- identifying by a mid-link server, a set of policies from a plurality of policies for the installation of the browser extension, wherein: the plurality of policies specify access to the plurality of browser extensions to be used at the client device for accessing a plurality of functionalities associated with the plurality of browser extensions, and the plurality of functionalities is associated with a user application on the client device;
- analyzing the browser extension on usage history for the installation of the browser extension;
- checking compliance with the set of policies of the browser extension, wherein non-compliance with one or more policies from the set of policies of the browser extension is flagged for a re-authorization; and
- based on the re-authorization, either the browser extension is allowed or blocked or partially allowed for the installation and access to the corresponding functionality of the browser extension.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
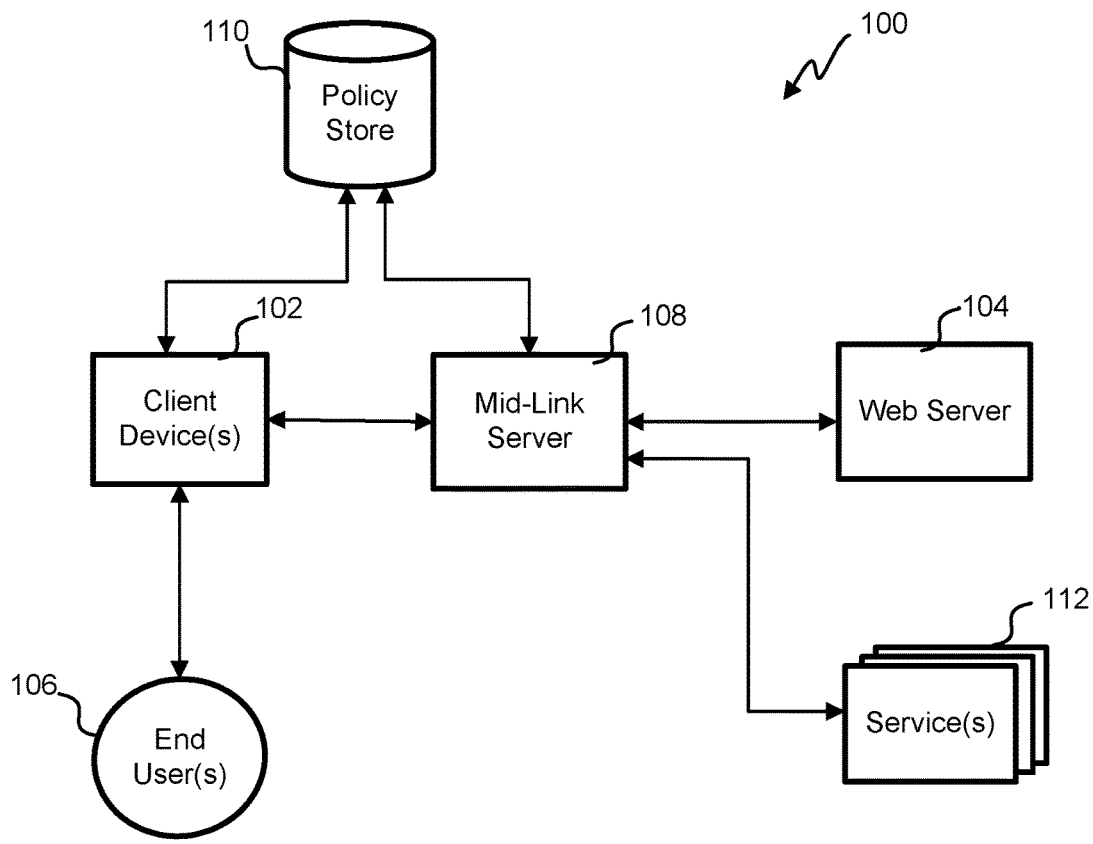
FIG. 1 illustrates a block diagram of an embodiment of a policy-based browser system.

Referring first to FIG. 1, a block diagram of a policy-based browser system 100 is shown. The policy-based browser system 100 includes a client device(s) 102, a web server 104, end-user(s) 106, a mid-link server 108, a policy store 110, and service(s) 112. The client device(s) 102 such as smartphones, tablets, PCs, and any other computing devices communicate with the web server 104 via encryption links using the internet. The client device(s) 102 can be secured by using the mid-link server 108 that remotely hosts a secured software environment. The client device(s) 102 run any popular operating system (OS) such as Windows™, iOS™ Android™, Linux, set-top box OSes such as Real-Time Operating System (RTOS), Unix OS, Linux-Kernel, and Linux OS in the Internet of Things (IoT)/Industrial control systems (ICS)/Distributed Control Systems (DCS)/Operational Technology (OT), and Chromebook™ The operating system of the client device(s) 102 runs third-party apps. The policy store 110 holds a plurality of policies for individual client device 102 and the mid-link server 108.

The client device(s) 102 use content and processing from the web server 104 including content sites, for example, web sites, plugins, streaming content, etc., and the service(s) 112 for example, SaaS tools, databases, cloud service providers, etc. Under policy control, the client device 102 routes some interaction to the mid-link server 108 that hosts a controlled software environment for individual end-user 106 to securely interact with the web server 104 and the service(s) 112 or enterprise tools in a way limited by specified policies. For example, policies can specify browser extensions that can be installed on the browser of the client device 102 while using the controlled software environment by remote access. The policies for browser extensions specify a manner in which the browser extensions are to be used by the end-user(s) 106.

The policies control how the browser extensions will be installed on the browser and provide a plurality of functionalities. Some applications that provide the service(s) 112 are accessed at the client device 102. These applications can also install the browser extensions with or lacks the end-user(s) permission. Other policies can enable certain software applications, browser extensions, or interaction on the client device 102 while physically on-premise and permitting different software applications, browser extensions, or interaction while working in the field or at home away from the enterprise premises. In one example, a policy associated with a browser extension on a browser of the client device 102, can disable access to features and functionalities of the browser extension on a remote software environment when accessed from a mobile of the end-user 106. In some cases, enforcement of the policy depends on whether the client device 102 is within the enterprise or away from the office. For example, the end-user 106 can be permitted to install the browser extension within the enterprise while the access to the browser extension can be blocked when the end-user 106 is away from the enterprise. In another embodiment, the policy can specify access to the browser extension during work hours and disable access after work hours. An example of the policies is illustrated in Table 1 discussed below.

Table 1 below illustrates a list of policies, a list of browser extensions, authorization, and an aggregate risk associated with the browser extensions stored in the policy store 110.

TABLE 1

| Policies | Browser Extension | Authorization | Aggregate Risk |
|---|---|---|---|
| Policy 1 | User Interface Modifications | Permit installation | 2 |
| Policy 2 | Ad blocking | Permit installation | 1 |
| Policy 3 | Cookie Management | Permit installation | 1.6 |
| Policy 4 | Browsing Session Exporting | Permit installation | 2.1 |
| Policy 5 | Calendar and Meeting | Block installation | 7.6 |
| Policy 6 | Grammar and Spell Checker | Block installation | 8 |

As illustrated in Table 1, the policies are specified with respective browser extension and risk (also termed as aggregate risk). The risk can be associated with malware, undesired behavior, or any suspicious activity associated with the browser extension. Traffic monitoring can be performed to check traffic flow and determine the risk associated with the traffic flow. An aggregate risk takes into consideration the risk associated with the browser extension and the risk associated with the traffic flow. The risk associated with the browser extension specifies a corresponding risk policy and the risk associated with the traffic flow specifies a corresponding traffic policy. The policy takes into consideration together the risk policy and the traffic policy. For example, Policy 1 is associated with the extension-user interface modifications which have an aggregate risk of 2 and enable the installation of the extension on the client device 102. The aggregate risk is a numerical value on a scale of 0-10 with 0 being the least and 10 being the highest. Similarly, policy 2 is associated with ad-blocking extension with an aggregate score of 1 and permits the installation of the extension. Policy 3 permits installation of cookie management extension and has an aggregate score of 1.6 and policy 4 permits installation of browsing session exporting extension and has an aggregate score of 2.1. Policy 5 blocks calendar and meeting extensions with an aggregate score of 7.6. Policy 6 restricts the installation of grammar and spell checkers and has an aggregate score of 8.

These policies associated with browser extensions are set based on several factors. The factors include network traffic, data loss, risks, and/or destination of browser extensions of the client device 102. The policies are set by an administrator of the organization of the end-user 106 or the enterprise based on the factors. In another embodiment, the policies can be set by the end-user 106 of the client device 102. The browser extensions that have been permitted access by the enterprise or the administrator for installation are authorized for use by the end-user 106 and the browser extensions that have restricted access for installation are not authorized for use as set by their corresponding policies.

The web server 104 includes the content sites such as websites, streaming content, or application websites, etc. to provide content to the client device(s) 102. The web server 104 also permits the end-user(s) 106 of the client device(s) 102 to upload and download content from the content sites. The web server 104 is in communication with the client device(s) 102 via the mid-link server 108 over the internet. In another embodiment, the policy-based browser system 100 includes one or more application servers (not shown) for providing dynamic content to the client device(s) 102.

The mid-link server 108 for the work systems resides as a "man-in-the-middle" and intentionally takes over some or all: processing, application execution, and/or content sites at the webserver 104 and the service(s) 112 interaction. The remote software environment is hosted by the mid-link server 108 for a policy-controlled experience using the policy store 110 for authorization. For example, the content sites at the webserver 104 can have certain applications disabled, filtered, or modified by the mid-link server 108 so that the client device(s) 102 behaves differently than if it were to directly connect to the content sites of the webserver 104. For example, a policy can specify the installation of the browser extension based on the risk permitted by the policy.

Some embodiments have policies that selectively direct the browser extensions to the mid-link server 108 based on the network traffic. The network traffic includes the traffic flow including the documents, applications being used, and data transmitted or received. The traffic flow is uninterruptedly monitored in real-time or over a period of time. A type of document shared or being used can further specify the installation of the browser extension. A classifier can identify a label or a tag of the document. For example, the document can be classified as restricted, or public based on a type of the document. For example, grammar or spell checker extensions for the document that is confidential and restricted are disabled. By way of another example, the browser extensions can be permitted for the calendar application during office hours or at an official system nonetheless can be restricted on the mobile or at a remote location from the office. Similarly, the browser extensions can be restricted for cookie management based on their respective policies. The browser extensions cannot be permitted for accessing a confidential document from an unauthorized application or browser extension.

The policy store 110 is a database that includes predefined policies for authorizing the browser extensions to access the functionalities or service(s) 112. The policy store 110 also includes the risks along with the browser extensions associated with the policies. The browser extensions include software applications that add features and functionalities to the web browser. For example, browser extensions can include ad-block, calendar, meeting, or screen capture extensions. The extensions provide the functionalities associated with the extension. For example, a policy associated with a calendar application specifies the use of authorized browser extensions. The policies can be predefined by the enterprise or the client device 102. Modified policies are also stored in policy store 110 by the administrator or the enterprise.

In an embodiment, the policy-based browser system 100 allows multiple-tenants in different domains to communicate with the web server 104 over the internet. The policy-based browser system 100 allows multiple tenants or enterprises (not shown) to all use the same network separated by domain or some other logical separation. The policy-based browser system 100 manages browser extensions used to access services in cloud-based multi-tenant system (s) (not shown). Encryption, leased/encrypted tunnels, firewalls, and/or gateways can be used to keep the data from one enterprise separate from other enterprises. Each client device 102 can communicate with the web server 104 for the service(s) 112 and storage using the internet. The mid-link server 108 provides multi-tenancy control, policies and routing for each domain.

Figure 2:
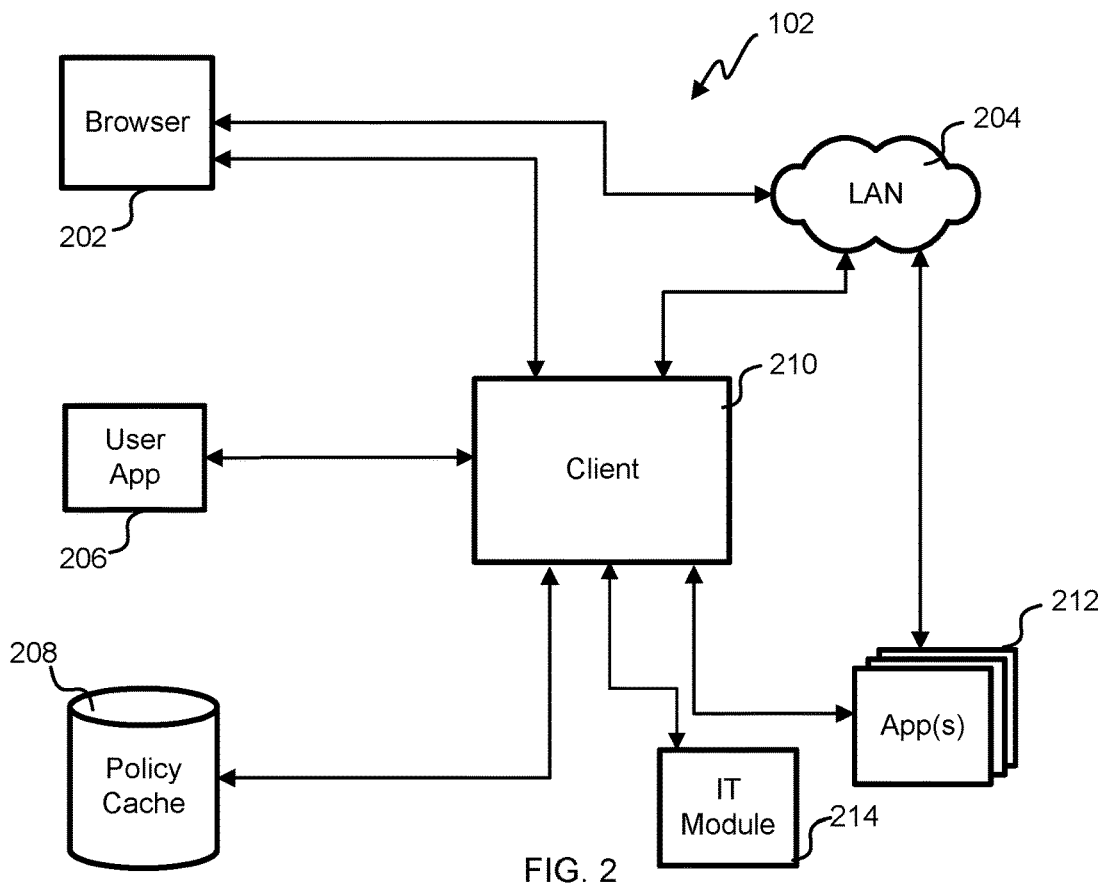
FIG. 2 illustrates a block diagram of a client device that uses a client to establish connections with a mid-link server.

Referring specifically to FIG. 2, a block diagram of the client device 102 is shown. This embodiment of the client device 102 uses a client 210 to establish connections with the mid-link server 108. A user app 206 exclusively uses the client 210 to communicate with the mid-link server 108 to maintain security for the operation of the user app 206.

Display of the remote software environment is performed by the user app 206. In an embodiment, the user app 206 can be a local application. The whole interface of the remote software environment could be displayed or the interface of a single user app could be displayed. Several instances of the user app 206 could display several user app interfaces respectively. Multiple instances of the user app 206 could have several remote software environments respectively running. For example, a user of Chromebook™ can have one user app 206 running iOS™ and another user app 206 running Linux™ with the ability to switch back-and-forth in full-screen or windowed mode. The user app 206 is a web browser or a video player in some embodiments merely displaying a stream of video. The browser extensions for different types of web browsers can also vary. Policies are defined for the browser extensions based on the type of web browser. For example, Chrome, Firefox, Safari, etc. can have the same or different browser extensions. However, the policies are based on aggregate risk.

The client 210 can apply policies that are stored locally in a policy cache 208 to the client device 102. The policy cache 208 is populated with the policies from the policy store 110 that are relevant for the respective client device 102. As conditions change, the policies that are in effect could also change. For example, the use of browser extensions that can access camera/video sensors-based applications on the client device 102 could be disabled inside the office or factory nonetheless re-enabled outside of a geofenced area. Certain features, functions, or applications might be disabled by a specific policy for the browser extensions until certain conditions exist. For example, there can be a policy that restricts browser extensions for accessing meeting apps on the mobile of the end-user 106 during offline hours or when using an unrecognized Virtual Private Network (VPN). Further, another policy permits the use of browser extensions for accessing calendar applications from the client device 102. Client 210 supports the user app 206, apps 212 running on the client device 102 or a browser 202 in communication with the mid-link server 108 via a Local Area Network (LAN) 204.

An Information Technology (IT) module 214 provides an interface for an administrator or IT staff of an organization of the end-user 106 for analyzing log reports and the browser extensions and assigning policies to the client device(s) 102. The administrator of the enterprise reviews the policies, the browser extensions, the network traffic, and the risk associated with the browser extensions. The log reports include analytics on plugins, data shared with plugin manager, the traffic patterns, malicious extensions, and the network traffic. The administrator can also modify the policies by updating and/or upgrading the policies using the IT module 214.

Figure 3:
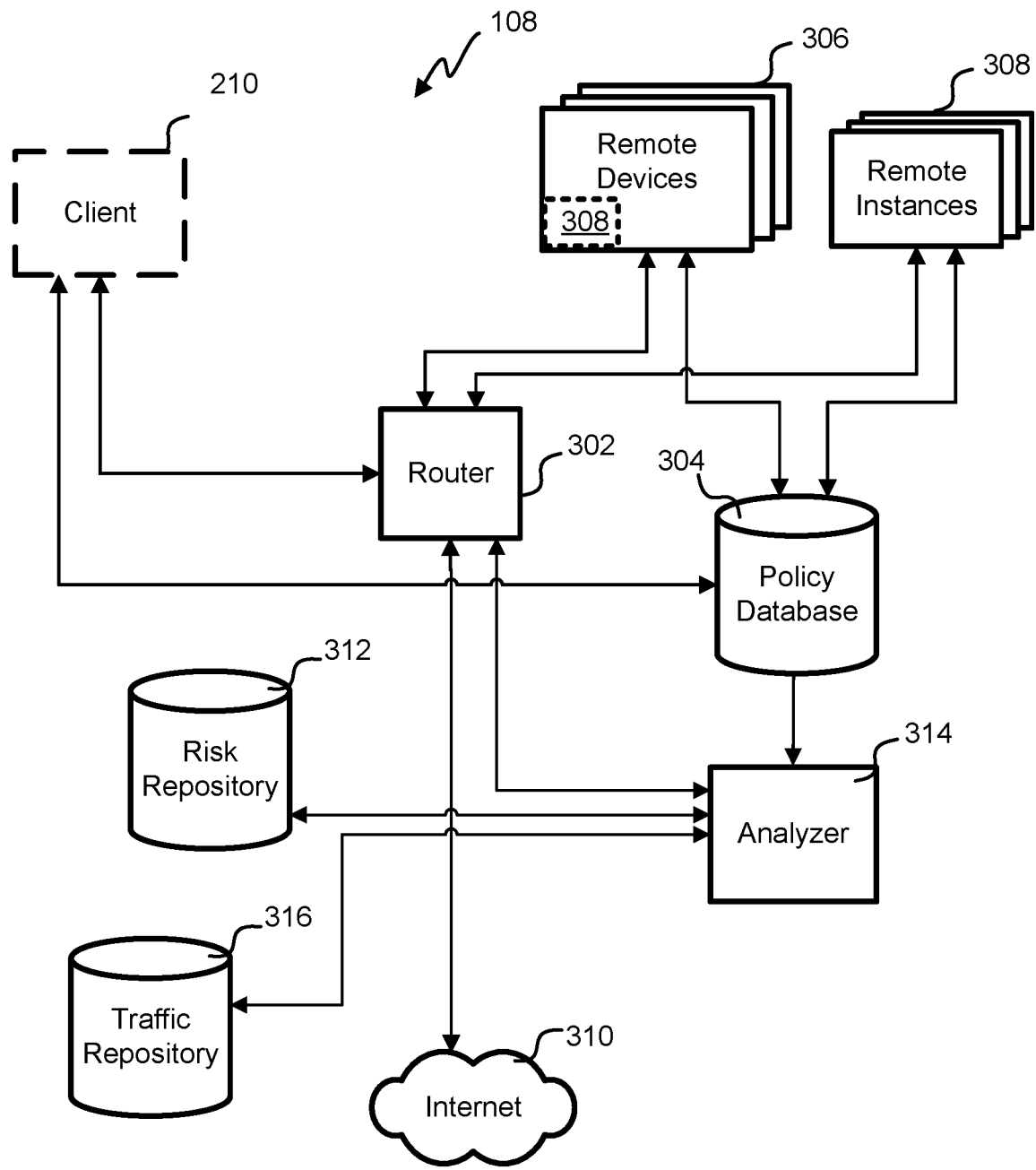
FIG. 3 illustrates a block diagram of a mid-link server that hosts software environments that client device(s) remote into.

Referring next to FIG. 3, a block diagram of the mid-link server 108 is shown that hosts software environments that the client device(s) 102 remote into. Traffic is passed with an Internet 310 accessed through a router 302 to enable the various depicted components of the mid-link server 108 to communicate with each other, specifically, the client 210, a policy database 304, remote devices 306, remote instances 308, a risk repository 312, an analyzer 314, and a traffic repository 316.

The mid-link server 108 hosts many different enterprises and domains keeping usage from their different client device(s) 102 separated. In other cases, the mid-link server 108 could be dedicated to a particular enterprise and hosted inside their network or the LAN 204 or with a third-party hosting service. In any event, individual remote instance 308 is dedicated to a client device 102 for use, although the IT staff have access to update software, apply policies, make configuration changes, modify admin settings and rights, etc. to maintain the remote instance 308. The client 210 connect with the client device(s) 102 over the Internet 310 in digitally segregated connections. The policies operate in higher levels of the Open Systems Interconnection (OSI) model, such as the application layer to provide enhanced control.

In an embodiment, the remote devices 306 can be physically remote devices 306 and the remote instances 308 can be virtual-machine remote instances 308. Both the physical remote devices 306 and the virtual-machine remote instances 308 are supported to run software environments. For example, the physical remote devices 306 can be tablets, smartphones, personal computers (Mac or PC), Chromebooks™, Linux™ servers, kiosks, or any personal computing device that employees might use. Any operating system running in a virtual machine on a physical device is supported to enable any enterprise to have their software environments running in secure, controlled, and potentially high-performance instantiations. The remote instances 308 host content sites, websites, or streaming content for the client device(s) 102. The router 302 provides communication between the client 210 and the remote instances 308. The router 302 allows the access or denial of the browser extensions based on the communication from the analyzer 314 before the browser extension is installed at the remote instances 308.

The remote devices 306 are physical hardware that hosts the remote instance 308 and is dedicated to the client device 102 currently connected to the mid-link server 108. Not all operating systems enable running in a development mode or as a virtual machine to support all the functionality of the remote instance 308. For those situations, the operating system is running on a physical device temporarily dedicated to the client device 102 with software to enable the end-user 106 to control the remote instance 308.

The policy database 304 includes a list of policies for setting up access between the client device 102 and the remote instances 308 for browser extensions. The policy database 304 also includes a list of authorized browser extensions based on which the installation on the client device 102 from the remote instances 308 is established. The browser extension to be used is matched within the list of policies and their corresponding risks for establishing the installation. The policies are set by the administrator of the enterprise. By way of an example, the browser extension of the calendar application can be permitted, and the browser extension of a social media app cannot be permitted based on the policies. In other embodiments, these policies are further modified based on the new policies or requests of the enterprise. Usage history of the browser extensions further influences the modification of the policies associated with the browser extensions. For example, based on a browser extension disabled by the administrator in the past, the policy can entail the browser extension to be re-authorized. By way of another example, the applications can be re-authorized by the administrator based on receiving a re-authorization request from the end-user 106, which can be regarding denial of the browser extension for the application by the mid-link server 108. Individual browser extension is associated with a traffic risk and a browser risk. The aggregate risk takes into consideration the traffic risk and the browser risk to generate a composite risk value. The traffic risk indicates a risk associated with the network traffic and the browser risk indicates a risk associated with malware from the browser extension. The aggregate risk determines whether the browser extension is safe to be installed on the client device 102.

The risk repository 312 includes a database of the browser extensions either authorized or restricted by the administrator or the enterprise/tenants of the end-user 106 of the client device 102. The risk repository 312 includes a list of the browser extensions from the policy store 110 which is categorized in the risk repository 312 based on their respective policies and a risk associated with them. The risk repository 312 further includes the browser extensions categorized based on the enterprise policies along with values of their browser risks. The categorization is performed by the analyzer 314 after determining the risks associated with the browser extensions. The risk categorization helps the analyzer 314 to request for re-authorization to the administrator or flag an alert to the client device 102. In the case of a newly found browser extension, the browser extension is authorized by the analyzer 314 and then re-authorized by the administrator in the IT module 214 or the end-user 106 of the client device 102. The new browser extension is categorized and added by the analyzer 314 in the risk repository 312 after the authorization.

The traffic repository 316 includes a database of the network traffic from the client device 102 which includes a list of applications running on the client device 102, the traffic flow including documents shared or used on the client device 102, and the data transmitted and/or received from the client device 102. The network traffic is continuously monitored by the analyzer 314 to accumulate data of the traffic and store it in the traffic repository. The network traffic is continuously observed in real-time or over a period of time. The network traffic is used for the analysis of the traffic flow by the analyzer 314 to either authorize or restrict the browser extensions by the administrator or the enterprise/tenants. Based on the analysis of the network traffic, it is identified whether the browser extension is authenticated for installation. Traffic policies categorize risks associated with the network traffic.

The analyzer 314 uses the list of browser extensions categorized based on the policies from the risk repository 312 and the network traffic analysis from the traffic repository 316 to identify an aggregate risk. Based on the aggregate risk, the browser extension may be allowed for installation or disabled. The aggregate risk based on the policy associated with the browser extension is categorized in the traffic repository 316 and the traffic policies associated with the network traffic. The aggregate risk is compared with a predetermined threshold value to determine whether to install the browser extension or not. If the aggregate risk has a value above the threshold value, then the browser extension is installed. If the aggregate risk has a value below the threshold value, then the browser extension is not installed.

The analyzer 314 further keeps a log of the browser extensions each time the browser extensions are used for the installation of the browser extensions. Compliance with the respective policies is checked to track any compromise or misconduct in complying with the policy. There can be malicious or unidentifiable browser extensions that create non-compliance. Unidentified, unauthorized, or malicious browser extensions are also flagged to the IT module 214 for re-authorization. For example, the analyzer 314 determines the aggregate risk associated with the browser extension, categorizes the browser extension as malicious based on the aggregate risk, and flags to the client device 102 and/or the IT module 214 for inspection and re-authorization. Based on the compliance with the policies and the aggregate risks, the browser extensions are scored and ranked.

Figure 4:
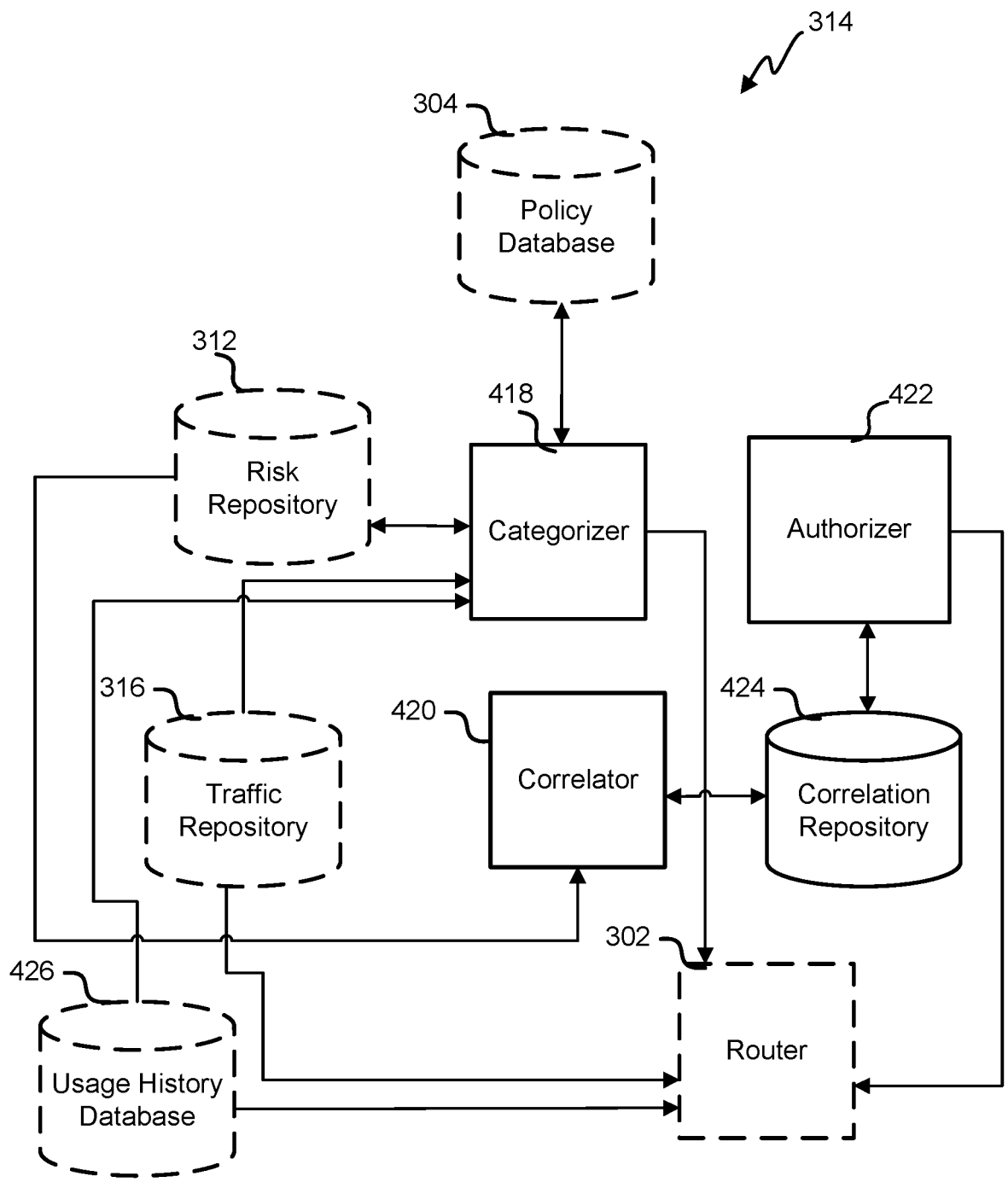
FIG. 4 illustrates a block diagram of an analyzer configured to categorize, correlate, and authorize broken extensions.

Referring next to FIG. 4, a block diagram of the analyzer 314 configured to categorize, correlate, and authorize the broken extensions is shown. The analyzer 314 includes a categorizer 418, a correlator 420, an authorizer 422, a correlation repository 424, and a usage history database 426.

The categorizer 418 receives the list of policies for the browser extensions as set by the administrator or the enterprise/tenants from the policy database 304. The categorizer 418 uses the list of policies to categorize each of the browser extensions in the risk repository 312. The browser extensions are categorized into multiple categories based on their respective policies. The browser extensions are further subcategorized into a list of categorized browser extensions based on a risk score associated with them. For example, the risk score is used to categorize the browser extension as a malicious browser extension. The browser extension is inspected and re-authorized. The risk score can be a numerical value on a scale of 10-100 with 100 indicating the highest score and correspondingly the highest risk. The categorizer 418 identifies each of the browser extensions and compares them with user logs in the risk repository 312 to determine the risk score associated with them. The browser extensions are categorized based on the usage history and risk information of the browser extensions which are received from data sources or Application Programming Interfaces (APIs). The risk information is collected from publicly and privately available data sources such as social media or weblinks that describe the browser extensions. Machine learning algorithms can be used to extract the risk information.

For example, if a browser extension used in past for accessing an application was blocked by the administrator multiple times, the risk score for the browser extension is considered high. Accordingly, the browser extension is subcategorized as malicious and bad. Another browser extension that was at no time blocked by the administrator then restricted by the client device 102, has the risk score level of 8 and the browser extension is, therefore, subcategorized as nefarious. Some browser extensions can be unidentifiable. These browser extensions are subcategorized as anonymous. The browser extensions that are new and do not have past usage are categorized as new. The browser extension can also be subcategorized as blocked in case the browser extension was blocked in the past. The categorizer 418 flags an alert to the IT module 214 or the end-user 106 of the client device 102 for re-authorization via the router 302. The categorization is based on machine learning algorithms or fuzzy logic. The categorizer 418 continuously monitors and updates the categories of the browser extensions based on the user logs from the usage history database 426.

The correlator 420 uses the list of categorized browser extensions in the risk repository 312 to match a browser extension received from a request of the client device 102. If the browser extension is found matching within the list of categorized browser extensions, the policy associated with the matched browser extension and the corresponding application for which it is used is identified. If the browser extension is identified as authorized as per the policy of the browser extension, the browser extension is permitted to be used and installed to access the functionality of the browser extension. If the browser extension is found unauthorized, the browser extension is blocked for installation or use to prevent access to the functionality of the browser extension and is reported for re-authorization to the IT module 214. The correlated browser extensions are stored in the correlation repository 424 for further analysis.

The correlation repository 424 is a database for the correlated browser extensions. After being matched with the list of categorized browser extensions in the correlator 420, the browser extensions are stored in the correlation repository 424.

The usage history database 426 stores the usage history of the browser extensions acquired from logs of the client device(s) 102. The usage history also includes administrator reports and user reports. The administrator reports include information on blocked browser extensions, re-authorized browser extensions, or unidentified browser extensions obtained from the administrator. Also, information on the browser extensions from the client device 102 and other data sources such as blogs, websites, and social media are incorporated in the user reports. The usage history is useful in categorizing and identifying the browser extensions. The usage history is shared with the IT module 214 for further analysis via the router 302.

The authorizer 422 retrieves the correlated browser extensions from the correlation repository 424. The authorizer 422 assigns different risk scores to each of the browser extensions based on their categories, compliance with the policies, and the risk score. A machine-learning algorithm can be used to assign the different risk scores to the browser extensions. The risk scores indicate a need to re-authorize the browser extensions and/or disable them temporarily. The risk scores can be numerical values, heat maps, or charts. By way of an example, high-risk scores can indicate a higher trust in the browser extension in terms of security whereas low confidence browser extensions can indicate a lower trust in the browser extension in terms of security. The risk scores can further be used to rank the browser extensions in the order of their scores. The risk scores can also be updated based on changes in the policies, categories, and/or usage. The risk scores of each of the browser extensions are provided to the IT module 214 and/or the end-user 106 of the client device 102 via the router 302 for further analysis.

Figure 5:
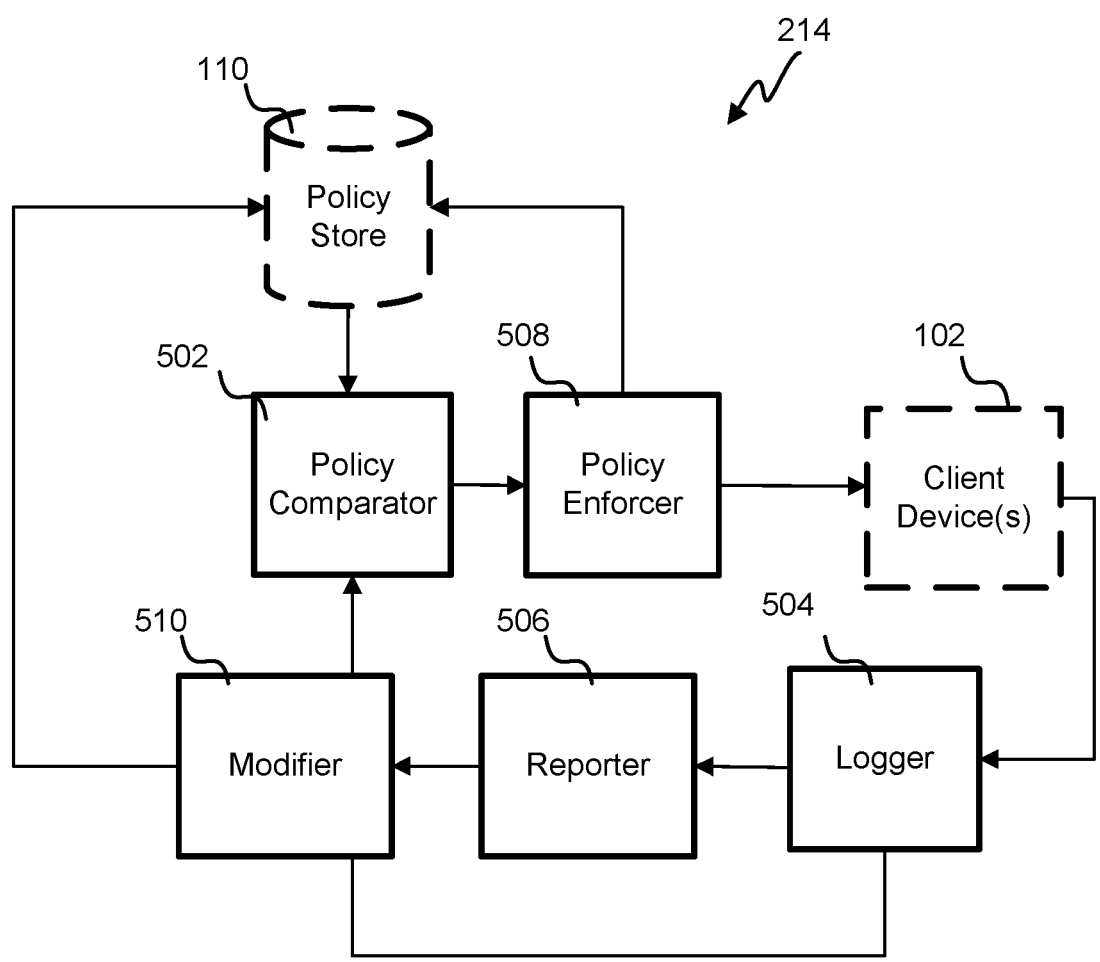
FIG. 5 illustrates a block diagram of an IT module configured to monitor browser extensions.

Referring next to FIG. 5, a block diagram of the IT module 214 configured to monitor the browser extensions is shown. The IT module 214 includes a policy comparator 502, a logger 504, a reporter 506, a policy enforcer 508, and a modifier 510. The IT module 214 provides an interface for an administrator or IT staff of the enterprise of the end-user(s) 106 for analyzing log reports and assigning policies to the client device(s) 102. The administrator of the enterprise reviews the policies, the browser extensions, and the applications. The administrator can also modify the policies by updating and/or upgrading the policies using the IT module 214.

The policy comparator 502 receives the usage history from the usage history database 426 acquired from user logs of the client device(s) 102. The usage history includes administrator reports and user reports on the browser extensions used in the past. The administrator reports include the information on blocked extensions, re-authorized extensions, and/or unidentified extensions provided by the administrator. The information further clarifies the reasons for blocking and re-authorizing the extensions. Identification and categorization information on the unidentified extensions and risk scores associated with the blocked extensions, re-authorized extensions, and/or the unidentified extensions are also included in the administrator reports.

The user reports include information on the extensions from the client device 102 such as enabling or disabling the browser extension or generating an alert for the browser extension. Other data sources such as blogs, websites, databases, and social media on the extensions are included in the user reports. Machine learning or artificial intelligence algorithms can be used to acquire the information of the user reports. The administrator reports and the user reports on the extensions are obtained from the logger 504 and stored in the usage history database 426. The policy comparator 502 further matches individual of the extensions used by the application of the client device 102 within an extension mapping list stored in the policy store 110. After matching the extensions, their respective policies or the modified policies are identified from the extension mapping list. A comparison output is generated based on the comparison of individual browser extension with the respective policy and provided to the policy enforcer 508 for further analysis.

The policy enforcer 508 identifies any compliance related issues with the past and current browser extensions based on the output and enforces the policies to the client device(s) 102. The policy enforcer 508 sets the policies in the policy store 110 based on network traffic, data loss, risks, user profile, and/or destination of browser extensions of the client device 102. By way of an example, a policy A for a browser extension A is identified by the policy comparator 502 based on a comparison of the browser extension A with the list of policies in the policy store 110. A corresponding output including any compliance related issues of the policy A is provided to the policy enforcer 508. The policy enforcer 508 checks that the browser extension A was used in accordance with the policy A. The policy A of the browser extension A specifies that the browser extension A is authorized to use. The policy enforcer 508 allows the browser extension A to be used by the application of the client device 102. Based on the user logs, the policy enforcer 508 confirms that the browser extension A is in compliance with the policy A. By way of another example, the comparison output from the policy comparator 502 specifies a policy B for a browser extension B which specifies that browser extension B is compromised. The policy enforcer 508 checks that the browser extension B being compromised requires re-authorization. The policy enforcer 508 temporarily disables the browser extension B. The policy enforcer 508 alerts the administrator to inspect the browser extension B. Based on approval or denial by the administrator, the policy enforcer 508 controls the use of the browser extension B at the client device 102.

The logger 504 is a repository of log reports of the browser extensions used at the client device(s) 102. The logger 504 also stores past log reports of policies implemented on the client device(s) 102. The logger 504 continuously monitors the browser extensions used by the applications of the client device(s) 102 and gathers log data from the client device(s) 102. The log reports are provided to the reporter 506 for further analysis.

The reporter 506 is an interface to facilitate the administrator to analyze the log reports of the past and current browser extensions of the client device(s) 102 obtained from the logger 504. The interface is coupled to a memory and a processor of a display device having input/output devices for communication. The administrator re-authorizes, permits, partially permits, temporarily disables, or permanently disables the browser extensions using the reporter 506. Based on the re-authorization, either the browser extension is allowed or blocked or partially allowed for a restricted time duration (during office hours). The administrator further modifies the policies based on the re-authorization using the reporter 506. The reporter 506 alerts the administrator regarding non-compliance of the policies and the risk levels associated with the browser extensions from the end-user(s) 106 of the client device(s) 102, the logger 504, and the mid-link server 108. The administrator can perform certain actions for the non-compliance of policies and unauthorized browser extensions. The administrator can send information on modification of the policies to the modifier 510 for further processing.

The modifier 510 processes the information from the reporter 506 to modify the policies. For example, the client device 102 can be enforced with updated policies and the corresponding browser extensions. The risk scores associated with the browser extensions are updated from time to time which entails the policies to be updated in the policy store 110. Newly identified or unidentifiable browser extensions further entail re-authorization from the administrator. The policies are updated after the re-authorization of the browser extensions. Based on a history of the browser extensions and the risk score associated with the browser extensions, the policies can be modified and implemented. The administrator provides the modified policies for storage in the policy store 110.

Figure 6:
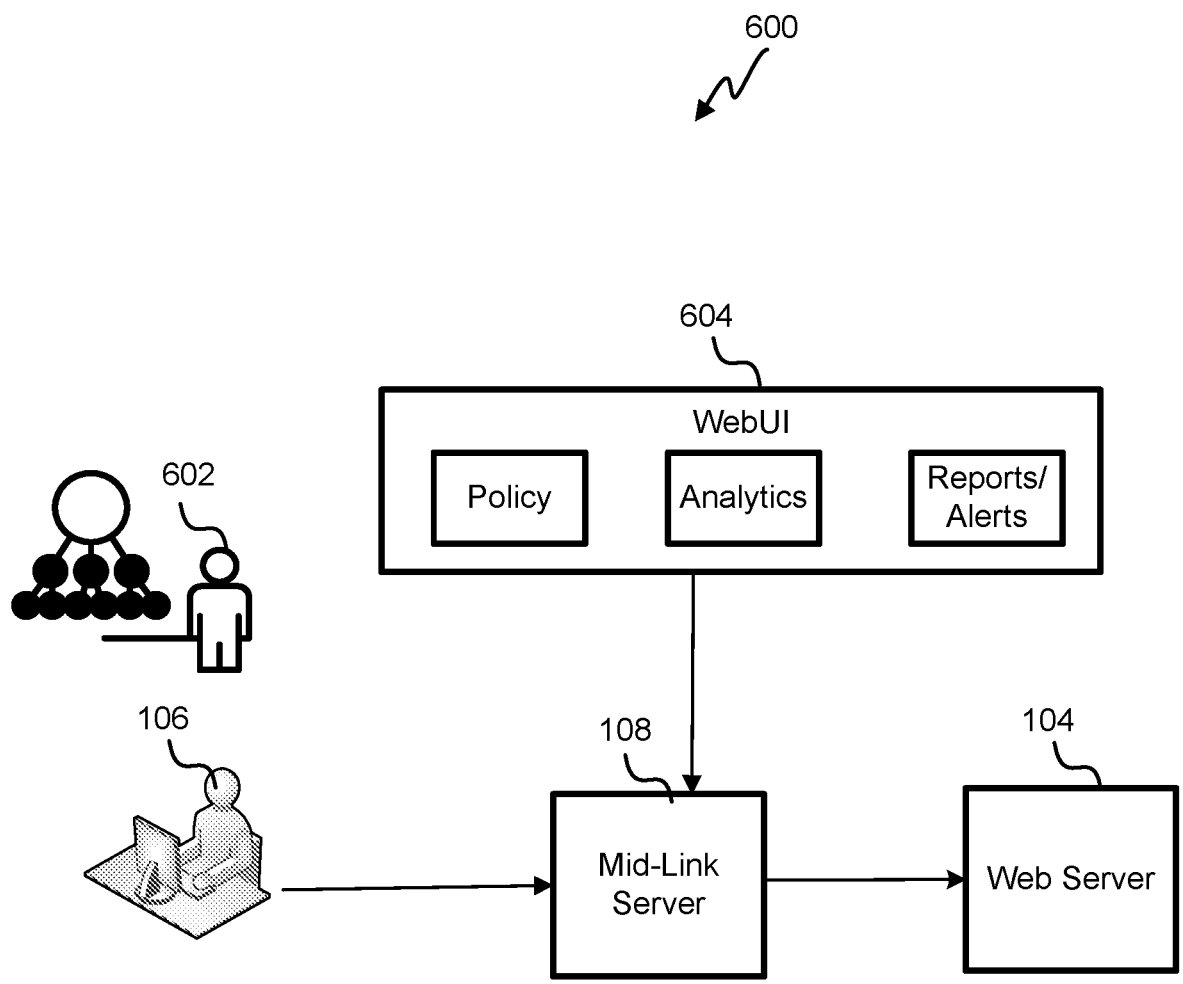
FIG. 6 illustrates a diagram of communication between an end-user at a client device, a mid-link server, and remote instances at a web server for accessing services including browser extensions.

Referring next to FIG. 6, a diagram 600 of communication between the end-user 106 at the client device 102, the mid-link server 108, and the remote instances 308 at the webserver 104 for accessing the service(s) 112 including browser extensions is shown.

The end-user 106 uses a local application running on the client device 102 to request an installation of a browser extension on the client device 102. The request is sent to a remote application running on the remote instance 308 for the installation of the browser extension via the mid-link server 108. The remote instance 308 sends an authorization request to the mid-link server 108 to authorize the browser extension based on a policy associated with the browser extension. The policy is associated with the installation of the browser extension that is used to establish a functionality or feature using the web browser of the client device 102. For example, a policy entails a browser extension related to a calendar application to be installed on the client device 102 based on the end-user 106 profile such as manager, employee, president, etc. Policies are predefined by the administrator 602 or the enterprise of the end-user 106 based on a user group, a business unit, a user profile, a user device, remote working hours, network connection, and/or geolocation. The policies are enforced by an administrator 602 at the client device 102 referred to as a first mile, the policies are inspected at the mid-link server 108 referred to as a middle mile, and the policies are implemented at the webserver 104 referred to as the last mile.

The mid-link server 108 checks the browser extension corresponding to the policies. The mid-link server 108 performs inspection at the middle mile using the policies from the list of policies stored in the risk repository 312. If the mid-link server 108 determines that the browser extension used to the web server 104 is in nonconformity with the policies, an alert is sent to the administrator 602 to resolve the issue. The determination can be based on machine learning algorithms. However, if the mid-link server 108 determines that the browser extension is per the policies, then the browser extension is authorized, and the request is granted to the browser extension on the client device 102.

The end-user 106 is granted access to the browser extension for being installed at the client device 102. The end-user 106 installs the browser extension authorized for access and uses the functionality associated with the browser extension. The web user interface 604 provides a user interface for the administrator 602 along with external information from Application Programming Interfaces (APIs). The external information is further provided to the mid-link server 108. Reports and alerts from the administrator 602 are provided to the web user interface 604 which is further provided to the mid-link server 108. The analytics in the web user interface 604 includes enablement of the traffic policy for extension identification and their analytics. The policy is based on the discovery of the browser for installation, the upload of data by a plugin, and the risk policy. The reports and alerts include observed plugins, data shared with plugin manager, analytics on traffic patterns use, analytics on malicious extensions, and data exchange analytics based on flows. The traffic patterns are continuously observed in real-time or over a period of time. The analytics is also based on data loss due to threat, analysis of destination Uniform Resource Locator (URL), and analysis of traffic destination or internet protocol (IP) address of the destination.

Figure 7:
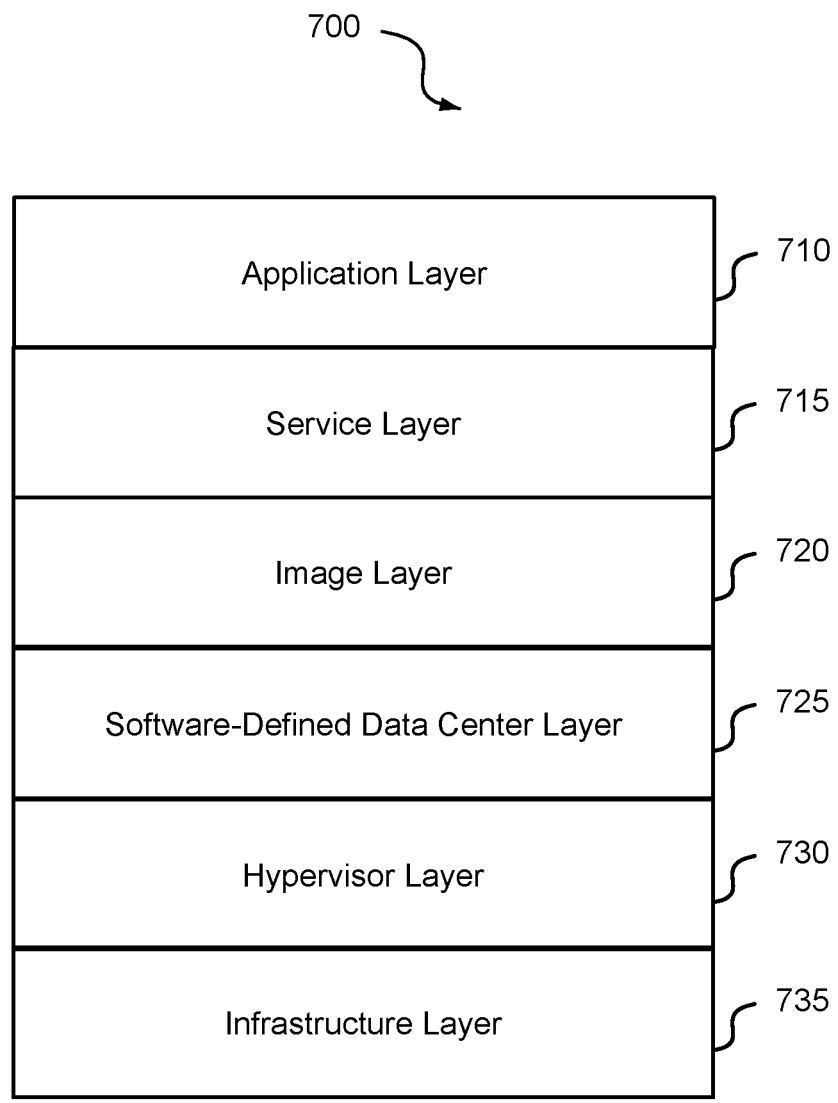
FIG. 7 illustrates a block diagram of a cloud OSI model for cloud computing environments.

Referring next to FIG. 7, a block diagram of an embodiment of a cloud OSI model for cloud computing environments is shown. The cloud OSI model 700 for cloud computing environments partitions the flow of data in a communication system into six layers of abstraction. The cloud OSI model 700 for cloud computing environments can include, in order, an application layer 710, a service layer 715, an image layer 720, a software-defined data center layer 725, a hypervisor layer 730, and an infrastructure layer 735. Individual layer serves a class of functionality to the layer above it and is served by the layer below it. Classes of functionality can be realized in software by various communication protocols.

The infrastructure layer 735 can include hardware, such as physical devices in a data center, that provides the foundation for the rest of the layers. The infrastructure layer 735 can transmit and receive unstructured raw data between a device and a physical transmission medium. For example, the infrastructure layer 735 can convert the digital bits into electrical, radio, or optical signals.

The hypervisor layer 730 can perform virtualization, which can permit the physical devices to be divided into virtual machines that can be bin packed onto physical machines for greater efficiency. The hypervisor layer 730 can provide virtualized compute, storage, and networking. For example, OpenStack® software that is installed on bare metal servers in a data center can provide virtualization cloud capabilities. The OpenStack® software can provide various infrastructure management capabilities to cloud operators and administrators and can utilize the Infrastructure-as-Code concept for deployment and lifecycle management of a cloud data center. In the Infrastructure-as-Code concept, the infrastructure elements are described in definition files. Changes in the files are reflected in the configuration of data center hosts and cloud services.

The software-defined data center layer 725 can provide resource pooling, usage tracking, and governance on top of the hypervisor layer 730. The software-defined data center layer 725 can enable the creation of virtualization for the Infrastructure-as-Code concept by using representational state transfer (REST) Application Programming Interfaces (APIs). The management of block storage devices can be virtualized, and end-users can be provided with a self-service API to request and consume those resources lacks requiring any knowledge of where the storage is deployed or on what type of device. Various compute nodes can be balanced for storage.

The image layer 720 can use various operating systems and other pre-installed software components. Patch management can be used to identify, acquire, install, and verify patches for products and systems. Patches can be used to correct security and functionality problems in software. Patches can also be used to add new features to operating systems, including security capabilities. The image layer 720 can focus on the compute instead of storage and networking. The instances within the cloud computing environments can be provided at the image layer 720.

The service layer 715 can provide middleware, such as functional components that applications use in tiers. In some examples, the middleware components can include databases, load balancers, web servers, message queues, email services, or other notification methods. The middleware components can be defined at the service layer 715 on top of particular images from the image layer 720. Different cloud computing environment providers can have different middleware components.

The application layer 710 can interact with software applications that implement a communicating component. The application layer 710 is the layer that is closest to the end-user 106. Functions of the application layer 710 can include identifying communication partners, determining resource availability, and synchronizing communication. Applications within the application layer 710 can include custom code that makes use of middleware defined in the service layer 715.

Various features discussed above can be performed at one or more layers of the cloud OSI model 700 for cloud computing environments. For example, translating the general policies into specific policies for different cloud computing environments can be performed at the service layer 715 and the software-defined data center layer 725. The policies and the browser extensions operate at the application layer 710. Various scripts can be updated across the service layer 715, the image layer 720, and the software-defined data center layer 725. Further, APIs and policies can operate at the application layer 710 that is at a web browser.

Each of the different cloud computing environments may have different service layers 715, image layers 720, software-defined data center layers 725, hypervisor layers 730, and infrastructure layers 735. Further, each of the different cloud computing environments may have an application layer 710 that can make calls to the specific policies in the service layer 715 and the software-defined data center layer 725. The application layer 710 may have substantially the same format and operation for each of the different cloud computing environments. Accordingly, developers for the application layer 710 may not need to understand the peculiarities of how each of the cloud computing environments operates in the other layers.

Figure 8:
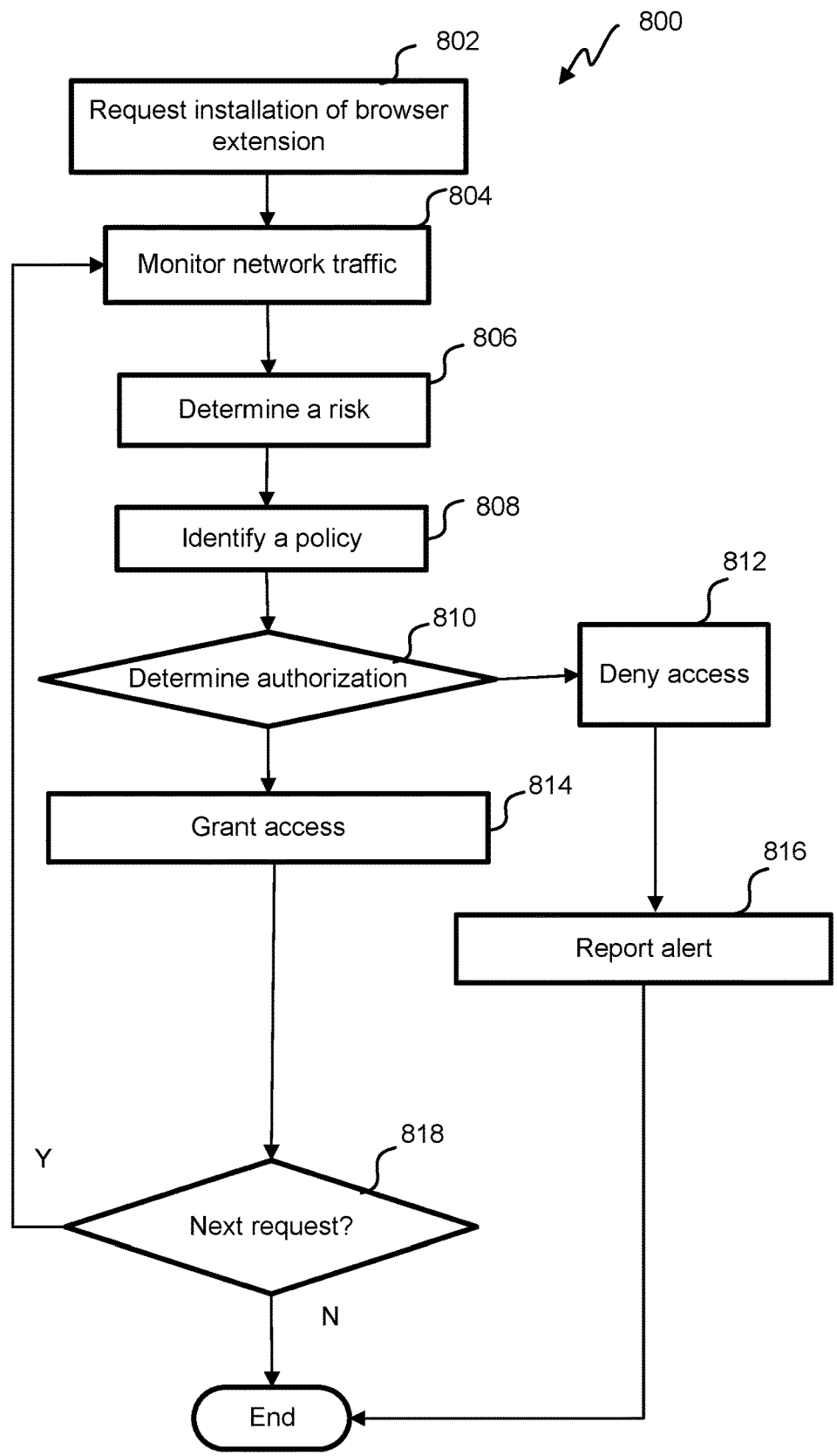
FIG. 8 illustrates a flowchart of a browser extension authentication process for installation on a client device.

Referring next to FIG. 8, a flowchart of an embodiment of a browser extension authentication process 800 for installation on a client device 102 is shown. The depicted portion of the process begins at block 802 where an end-user 106 of the client device 102 loads a web browser at the client device 102 and requests an installation of a browser extension. The request is initiated to the web server 104 via the mid-link server 108. The end-user 106 is interested to access a functionality associated with the browser extension. The mid-link server 108 acts as an intermediate server controlling the installation of the browser extension at a middle mile based on a set of policies. The web server 104 provides the functionalities associated with the browser extension to the end-user 106 at the last mile based on the authorization of the browser extension at the mid-link server 108.

At block 804, the network traffic from the client device is monitored to identify traffic patterns. The traffic patterns identify a type of message or document shared or used on the client device 102, and the packets of data being transmitted or received at the client device 102. The traffic patterns are continuously observed in real-time or over a period of time. The type of message or document shared helps identify confidentiality associated with the message or document. For example, a confidential document is opened at the client device 102 and the end-user 106 initiates a request to install a grammar related browser extension. In this case, the mid-link server 108 identifies the document used at the client device 102 as confidential, and based on a policy associated with confidential documents and grammar extensions, the mid-link server 108 blocks the installation of the grammar browser extension.

At block 806, a risk associated with the browser extension is determined based on the traffic patterns, and a comparison of the browser extension with a plurality of browser extensions in the risk repository 312. Based on the comparison of the browser extension with the browser extensions of the plurality of browser extensions, the risk is determined for the browser extension. The risk indicates a level of threat associated with the use of the browser extension.

At block 808, based on the identification of the risk associated with the browser extension, a policy is identified from the policy database 304. The policy specifies the authorization of the browser extension. A mapping of the browser extension and the policy exists in the policy database 304 which is used to identify the policy.

At block 810, the authorization is determined for the browser extension based on the identified policy. The authorization specifies whether the browser extension is to be installed or blocked. The policies also specify a time limit of use of the browser extension, for example, during working hours of an enterprise. The policies can also specify the use of browser extension based on enterprise resource planning (ERP), human resources information system (HRIS), personal or enterprise, a user designation like a manager, trainee, etc.

Based on the authorization, either the browser extension is denied access for installation at block 812 or granted access for installation at block 814. At block 812, after the browser extension is denied access for installation, reports regarding the denial are provided to the end-user 106 of the client device 102 or to the administrator at IT module 214 from the mid-link server 108 at block 816. At block 818, further requests for the browser extensions are analyzed. In case of further requests, the control moves at block 804 where network traffic from the request is monitored else the process ends.

Figure 9:
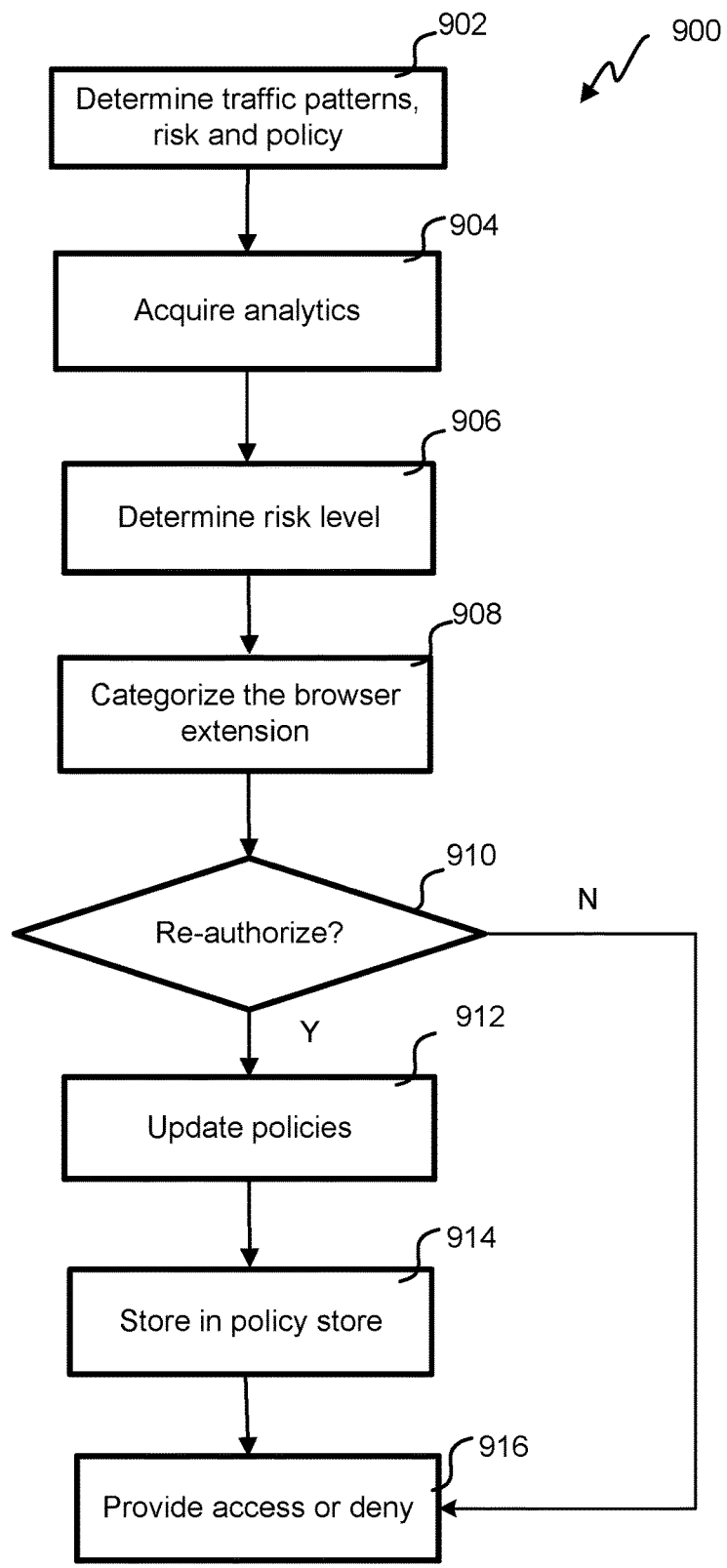
FIG. 9 illustrates a flowchart of an embodiment of a policy update process for updating policies associated with browser extensions.

Referring next to FIG. 9, a flowchart of an embodiment of a policy update process 900 for updating the policies associated with the browser extensions is shown. The depicted portion of the process begins at block 902 where traffic patterns are analyzed from the client device 102 and risk is determined based on the traffic patterns and the mapping of the browser extension in the risk repository 312. Based on the risk, a policy corresponding to the browser extension is determined.

At block 904, analytics is performed on the monitored traffic patterns and the browser extensions using machine learning algorithms to identify a usage history of the browser extensions from third-party resources like social media or web resources. A use pattern of the browser extension, like how many times it was installed or used lacks creating risk or a rating of the browser extension, or security level of the browser extension, is also identified.

At block 906, a risk level is determined based on the analytics and the identified policy. The risk level determines a threat to the data, enterprise, and the client device 102 if the browser extension is installed or used.

At block 908, the browser extension is categorized based on the risk level. For example, the browser extension can be rated based on a scale of 10-100 or represented as a heat map or categorized as high, medium, or low. The browser extension is categorized based on the analytics and the risk level. Scores can also be assigned based on the categorization.

At block 910, it is determined whether the browser extension needs authorization or re-authorization. For example, the usage history of the browser extension and the analytics from the third-party resources are used to determine whether the browser extension needs authorization or re-authorization. For example, if a browser extension is recently shown a high-risk level, then it entails re-authorization even if it was authorized for use in the past. The re-authorization is performed by the administrator or IT staff at the IT module 214.

At block 912, based on the determination, if the browser extension needs re-authorization, then the policy is updated at block 912. The updated policy is stored in the policy store 110 at block 914. However, if the browser extension does not need re-authorization, the policy remains the same. The access is granted or denied based on the policy or the updated policy at block 916. If the browser extension does not need re-authorization, then the control directly moves at block 916 where the access is granted or denied.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction (s) and/or data.

While the principles of the disclosure have been described above in connection with specific apparatuses and methods, it is to be clearly understood that this description is made only by way of example and not as limitation on the scope of the disclosure.

What is claimed is:

1. A policy-based browser system for managing browser extensions used to access functionalities on web browsers in a cloud-based multi-tenant system, the policy-based browser system comprising:
    a client device having a local application, the local application is used to access a functionality of a browser extension of a plurality of browser extensions, wherein the browser extension is requested for an installation on the client device;
    a web server configured to provide the functionality of the browser extension on a web browser of the client device; and
    a mid-link server configured to:
        identify a set of policies from a plurality of policies for the installation of the browser extension, wherein:
            the plurality of policies specify access to the plurality of browser extensions to be used at the client device for accessing a plurality of functionalities associated with the plurality of browser extensions, and
            the plurality of functionalities is associated with a user application on the client device;
        analyze the browser extension on usage history for the installation of the browser extension;
        check compliance with the set of policies of the browser extension, wherein non-compliance with one or more policies from the set of policies of the browser extension is flagged for a re-authorization; and
        based on the re-authorization, either the browser extension is allowed or blocked or partially allowed for the installation and access to the corresponding functionality of the browser extension.

2. The policy-based browser system for managing browser extensions used to access functionalities on web browsers in a cloud-based multi-tenant system as recited in claim 1, wherein the re-authorization is performed by an administrator associated with the client device.

3. The policy-based browser system for managing browser extensions used to access functionalities on web browsers in a cloud-based multi-tenant system as recited in claim 1, wherein an authorizer of an analyzer of the mid-link server is configured to assign risk scores to each of the plurality of browser extensions based on corresponding categories, compliance with the policies, and the risk score, wherein the re-authorization of the browser extension is based on the corresponding risk score.

4. The policy-based browser system for managing browser extensions used to access functionalities on web browsers in a cloud-based multi-tenant system as recited in claim 1, wherein the plurality of policies is based on network traffic, data loss, risks, and/or destination of browser extensions of the client device.

5. The policy-based browser system for managing browser extensions used to access functionalities on web browsers in a cloud-based multi-tenant system as recited in claim 1, wherein the browser extension is a plugin.

6. The policy-based browser system for managing browser extensions used to access functionalities on web browsers in a cloud-based multi-tenant system as recited in claim 1, wherein the plurality of policies is modified based on the re-authorization.

7. The policy-based browser system for managing browser extensions used to access functionalities on web browsers in a cloud-based multi-tenant system as recited in claim 1, wherein the plurality of policies is associated with the installation of the browser extension that is used to establish the functionality or feature using the web browser of the client device.

8. A method for policy-controlled browser extensions for providing secure access to features and functionalities from a browser in cloud-based multi-tenant systems, the method comprising:
   requesting by a local application running on a client device, access to a functionality on a browser extension of a plurality of browser extensions, wherein the browser extension is requested for an installation on the client device;
   identifying by a mid-link server, a set of policies from a plurality of policies for the installation of the browser extension, wherein:
      the plurality of policies specify access to the plurality of browser extensions to be used at the client device for accessing a plurality of functionalities associated with the plurality of browser extensions, and
      the plurality of functionalities is associated with a user application on the client device;
   analyzing the browser extension on usage history for the installation of the browser extension;
   checking compliance with the set of policies of the browser extension, wherein non-compliance with one or more policies from the set of policies of the browser extension is flagged for a re-authorization; and
   based on the re-authorization, either the browser extension is allowed or blocked or partially allowed for the installation and access to the corresponding functionality of the browser extension.

9. The method for policy-controlled browser extensions for providing secure access to features and functionalities from a browser in cloud-based multi-tenant systems as recited in claim 8, wherein the re-authorization is performed by an administrator associated with the client device.

10. The method for policy-controlled browser extensions for providing secure access to features and functionalities from a browser in cloud-based multi-tenant systems as recited in claim 8, further comprising assigning risk scores to each of the plurality of browser extensions based on corresponding categories, compliance with the policies, and the risk score, wherein the re-authorization of the browser extension is based on the corresponding risk score.

11. The method for policy-controlled browser extensions for providing secure access to features and functionalities from a browser in cloud-based multi-tenant systems as recited in claim 8, wherein the plurality of policies is based on network traffic, data loss, risks, and/or destination of browser extensions of the client device.

12. The method for policy-controlled browser extensions for providing secure access to features and functionalities from a browser in cloud-based multi-tenant systems as recited in claim 8, wherein the browser extension is a plugin.

13. The method for policy-controlled browser extensions for providing secure access to features and functionalities from a browser in cloud-based multi-tenant systems as recited in claim 8, wherein the plurality of policies is modified based on the re-authorization.

14. The method for policy-controlled browser extensions for providing secure access to features and functionalities from a browser in cloud-based multi-tenant systems as recited in claim 8, wherein the plurality of policies is associated with the installation of the browser extension that is used to establish the functionality or feature using a web browser of the client device.

15. A browser controlled system for providing access to browser extensions based on policies in cloud-based multi-tenant systems, the browser controlled system comprising a plurality of servers, collectively having code for:
   requesting by a local application running on a client device, access to a functionality on a browser extension of a plurality of browser extensions, wherein the browser extension is requested for an installation on the client device;
   identifying by a mid-link server, a set of policies from a plurality of policies for the installation of the browser extension, wherein:
      the plurality of policies specify access to the plurality of browser extensions to be used at the client device for accessing a plurality of functionalities associated with the plurality of browser extensions, and
      the plurality of functionalities is associated with a user application on the client device;
   analyzing the browser extension on usage history for the installation of the browser extension;
   checking compliance with the set of policies of the browser extension, wherein non-compliance with one or more policies from the set of policies of the browser extension is flagged for a re-authorization; and
   based on the re-authorization, either the browser extension is allowed or blocked or partially allowed for the installation and access to the corresponding functionality of the browser extension.

16. The browser controlled system for providing access to browser extensions based on policies in cloud-based multi-tenant systems as recited in claim 15, wherein the re-authorization is performed by an administrator associated with the client device.

17. The browser controlled system for providing access to browser extensions based on policies in cloud-based multi-tenant systems as recited in claim 15, further comprising assigning risk scores to each of the plurality of browser extensions based on corresponding categories, compliance with the policies, and the risk score, wherein the re-authorization of the browser extension is based on the corresponding risk score.

18. The browser controlled system for providing access to browser extensions based on policies in cloud-based multi-tenant systems as recited in claim 15, wherein the plurality of policies is based on network traffic, data loss, risks, and/or destination of browser extensions of the client device.

19. The browser controlled system for providing access to browser extensions based on policies in cloud-based multi-tenant systems as recited in claim 15, wherein the browser extension is a plugin.

20. The browser controlled system for providing access to browser extensions based on policies in cloud-based multi-tenant systems as recited in claim 15, wherein the plurality of policies is modified based on the re-authorization.

* * * * *